Oct. 25, 1966 G. A. DAWSON 3,281,072

GRADE-AVERAGING DEVICE

Filed Oct. 21, 1965 2 Sheets-Sheet 1

INVENTOR.
George A. Dawson,
BY
[signature]
ATTORNEYS.

GRADE-AVERAGING DEVICE

Filed Oct. 21, 1965 2 Sheets-Sheet 2

INVENTOR.
George A. Dawson,
BY

ATTORNEYS

United States Patent Office 3,281,072
Patented Oct. 25, 1966

3,281,072
GRADE-AVERAGING DEVICE

George A. Dawson, R.R. 1, Crawfordsville, Ind.

Filed Oct. 21, 1965, Ser. No. 499,919
10 Claims. (Cl. 235—83)

This invention relates to a device which, although it has other uses, is primarily intended for use by school teachers who have occasion to average pupils' grades. The device is equally adapted for the averaging of grades expressed in percent or in letters. In averaging letter grades, it is common to assign to each grade a numerical value, such as 12 for an A plus, 11 for an A, and so on down to 1 for a D minus and zero for an F, add the numerical values, divide the total by the number of grades, and pick as the average the letter grade whose numerical value corresponds most nearly to the quotient. The averaging of grades expressed in percent is an easier process, but still involves the necessity for calculations which it is the object of my invention to eliminate.

A grade-averaging device embodying my invention in its preferred form comprises a base plate, conveniently circular in shape, superposed on which is a rotatably mounted disk carrying an upwardly projecting stop pin adapted, in either direction of disk-rotation, to engage one side or the other of an abutment secured to the base and overlying the peripheral portion of the disk. Within the radial limits of the abutment, the disk is provided with a circumferentially extending series of holes or recesses spaced at equal angular intervals. The base, beyond the periphery of the disk, displays a first series of numbered graduations beginning with the number 100 and extending circumferentially in decreasing order from one side of the abutment in the direction in which such abutment-side faces. A second and similar series of lettered graduations provided on the base extends in the opposite direction from the opposite side of the abutment. Within the periphery of the disk the base plate is provided with a plurality of circular scales of graduated radii, there being one scale for the number of grades in each series to be averaged. Such circular scales are readable through windows provided in the disk if the disk is of opaque material.

A grade-averaging operation begins with the disk in a starting position determined by engagement of the stop-pin on the disk with one or the other sides of the base-abutment, depending upon whether the grades to be averaged are expressed in percent or in letters. Each grade in the series to be averaged is then put into the device by inserting a stylus in that hole or recess of the disk which lies opposite such grade as indicated by the graduations on the base at the periphery of the desk and then rotating the disk until the stylus engages the abutment on the base. After all the grades of the series have thus been put into the device, the average grade can be read through the appropriate window from that circular scale which corresponds to the number of grades in the series being averaged.

Other objects and features of the invention will become apparent from the following description of a preferred embodiment and from the enclosed drawing, in which.

Figures 1, 2:
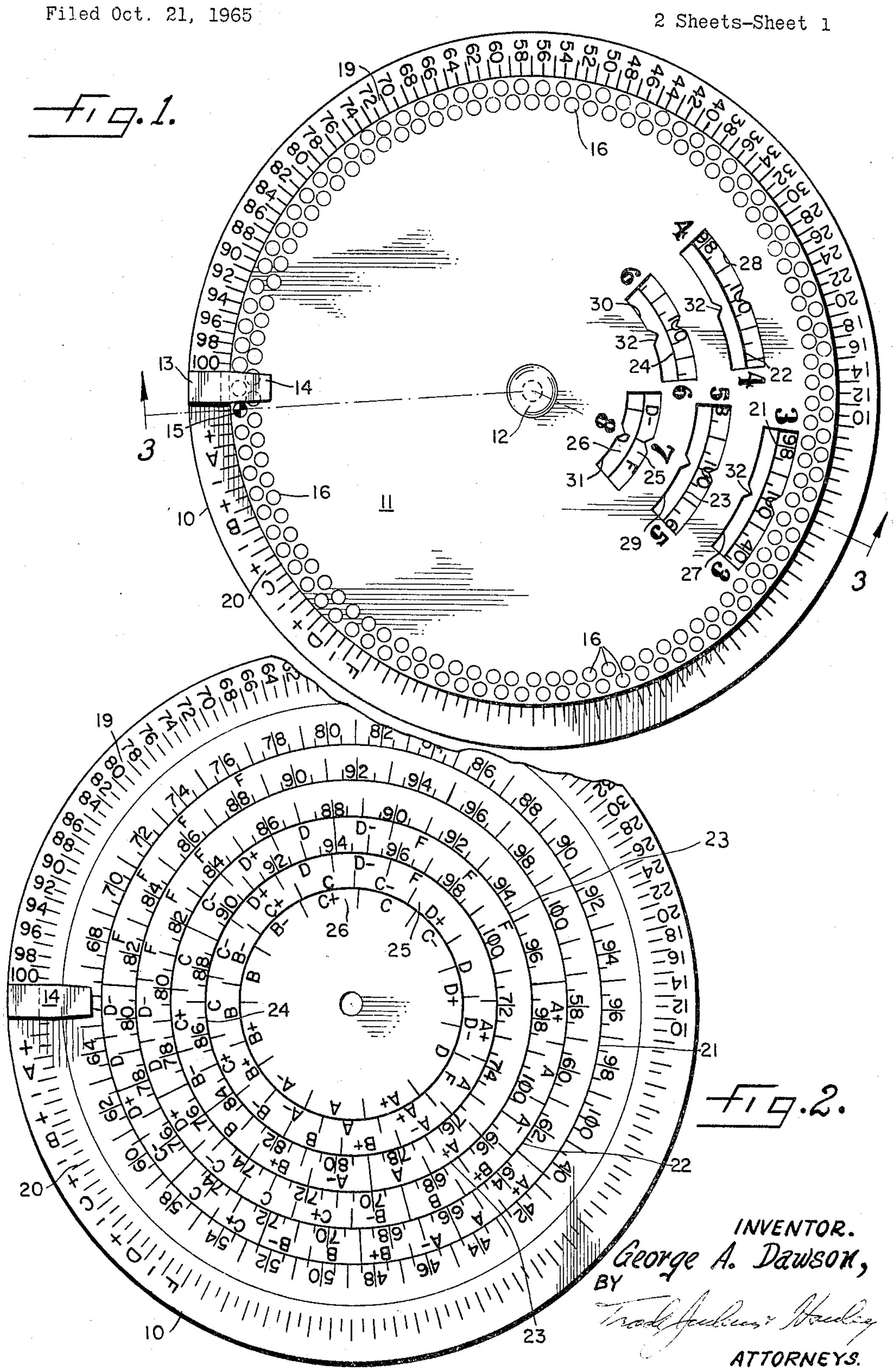
FIG. 1 is a plan view of the complete device showing the disk in the position occupied at the beginning of an operation involving the averaging of a percentage grade.
FIG. 2 is a plan view of the base plate with the disk removed.
Figure 3:
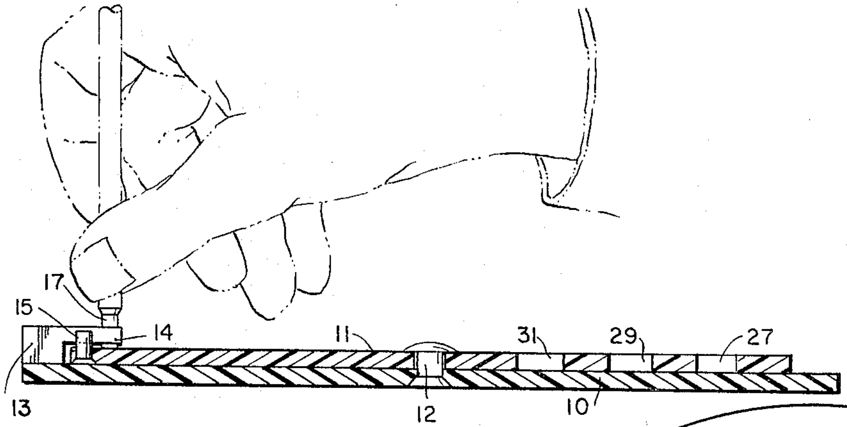
FIG. 3 is a vertical section of the line 3—3 of FIG. 1.

As will be clear from FIGS. 1 and 3, a preferred form of my device embodies a base plate 10, conveniently circular, on which is superposed a circular disk 11 concentric with the base plate and rotatably connected thereto, as through the medium of a pivot pin 12. The base plate is larger in diameter than the disk and has near its periphery an upwardly projecting ear 13 including an abutment-forming portion 14 which extends inwardly for a distance above the disk 11. Near its periphery, the disk is provided with an upwardly projecting pin 15 which, by engagement with the abutment 14, defines the position to be occupied by the disk at the beginning of a grade-averaging operation.

Extending circumferentially of the disk in both directions from the pin 15 and within the radial limits of the abutment 14, is a series of equally spaced recesses 16. Conveniently, such series of recesses extends completely around the disk. In order that the recesses may perform their intended function (hereinafter set forth) without being too small, while keeping the overall dimensions of the device within appropriate limits, the recesses are conveniently staggered radially, as shown in the drawing. While the angular spacing of the recesses may vary, I find it convenient to space adjacent recesses at intervals of 2°, with the interval between the pin 15 and each of the recesses immediately adjacent it also 2°. Each recess 16 is adapted to receive the end of a stylus 17 (FIG. 3) which is employed to rotate the disk through angles of definite extent. In so functioning, the stylus is inserted in a selected recess and moved, carrying the disk with it, until it strikes the abutment 14. The effective width of the abutment is such that when a recess has been brought into tangency with one of its sides, by manipulation of the stylus as just described, the other side of the abutment will be tangent to another recess. When the recesses 16 are radially staggered, as shown, each stylus-engaging side of the abutment should be parallel to a disk-radius passing through the center of a recess tangent to the abutment-side.

Extending along the periphery of the base plate 10 from one side of the abutment is a first scale or series of graduations 19. Such graduations, which are for use in the averaging of percentage grades, have an angular spacing equal to that between adjacent ones of the recesses 16 and are labeled with numbers in decreasing order from "100," the graduation numbered "100" being on the radius of a recess 16 tangent to one side of the abutment 14. As shown, the scale 19 extends in a clockwise direction from the clockwise side of the abutment, with its last numbered graduation bearing the number "10"; but the scale may, if desired, terminate with a graduation of higher number or may continue to a zero graduation if desired.

A second scale or series of graduations 20 extends in a counterclockwise direction along the periphery of the base plate 10 from the counterclockwise side of the abutment 14. The second scale is used in the averaging of letter grades, and its graduations are therefore serially labeled "A+," "A," "A—," etc., to "F" as shown. As compared with grading on a percentage basis, grading on a letter basis provides fewer steps between the lowest passing grade and the highest grade employed, and the labeled graduations of scale 20 may therefore be, and preferably are, spaced at wider intervals than the graduations of scale 19. However, such wider intervals should be equal integral multiples of the interval between adjacent ones of the recesses 16. As shown, the interval between adjacent labeled graduations of scale 20 is 4°, or twice that between adjacent recesses 16. The scale 20 may continue in a counterclockwise direction beyond the "F" graduation to enable the operator to give appropriate weight to the degree by which a grade to be averaged fails to reach the lowest passing grade of D—.

For the purpose of indicating the average of a series of grades, the base plate 10 is provided, within the periphery of the disk 11, with circular concentric scales, shown as six in number, of graduated radii, such scales being indicated in FIG. 2 by the reference numerals 21 to 26 inclusive. In the particular embodiment shown in the drawings, the outer scale 21 is used to indicate the average of three grades, while the remaining scales, in order of decreasing diameter, are used respectively in averaging four, five, six, seven and eight grades. The four scales 21–24 are respectively visible through four windows 27–30 of limited angular extent provided in the disk 11, while a fifth window 31 exposes both of the two innermost scales 25 and 26. Such windows are desirably staggered circumferentially to avoid undue weakening of the disk. The windows may have arcuate sides provided with triangular projections 32 serving as pointers for use in reading the scales 21–26. Conveniently, the windows are labeled with numbers, shown in FIG. 1 at the ends of the windows 27–30 and at the sides of window 31, indicating which will display the average of the particular number of grades being averaged. Thus, the outer window 27, which exposes the outer scale 22 that is used in averaging three grades, is labeled "3," the window 28 exposing the scale 23 used in averaging four grades is labeled "4," and so on through window 25, while window 26 bears the numbers "7" on its outer side and "8" on its inner side.

At the start of a grade-averaging operation, the disk 11 is rotated to bring its pin against one side or the other of the abutment 14, depending upon whether the grades to be averaged are percentage grades or letter grades. FIG. 1 illustrates the disk disposed with the pin against the counterclockwise side of the abutment, which is the starting position for an averaging of percentage grades. Each of the grades in the series to be averaged is put into the device by inserting the stylus 17 into the recess 16 opposite the graduation of scale 19 corresponding to the grade and then rotating the disk in a counterclockwise direction until the stylus engages the abutment 14. In the specific device shown, where the recess 16 tangent to the clockwise side of the abutment is opposite the "100" graduation 19, no rotation of the disk is involved in putting a grade of "100" into the device.

The graduations of the several scales 21–26 are so labeled and oriented about the disk axis that the average of a series of grades put into the device will appear at the pointer 32 associated with the circular scale corresponding to the number of grades in the series. To that end, in the specific device as so far described the "100" graduations of the scales 21, 22, 23, and 24 appear at the associated pointers 32 when the disk is in its initial position. Also, with the recesses 16 spaced at 2° intervals, the graduations of the scales 21–24 will be spaced respectively at intervals of 6°, 8°, 10°, and 12°, with the graduations of each scale labeled with numbers of increasing size in the clockwise direction.

Figures 4, 5:
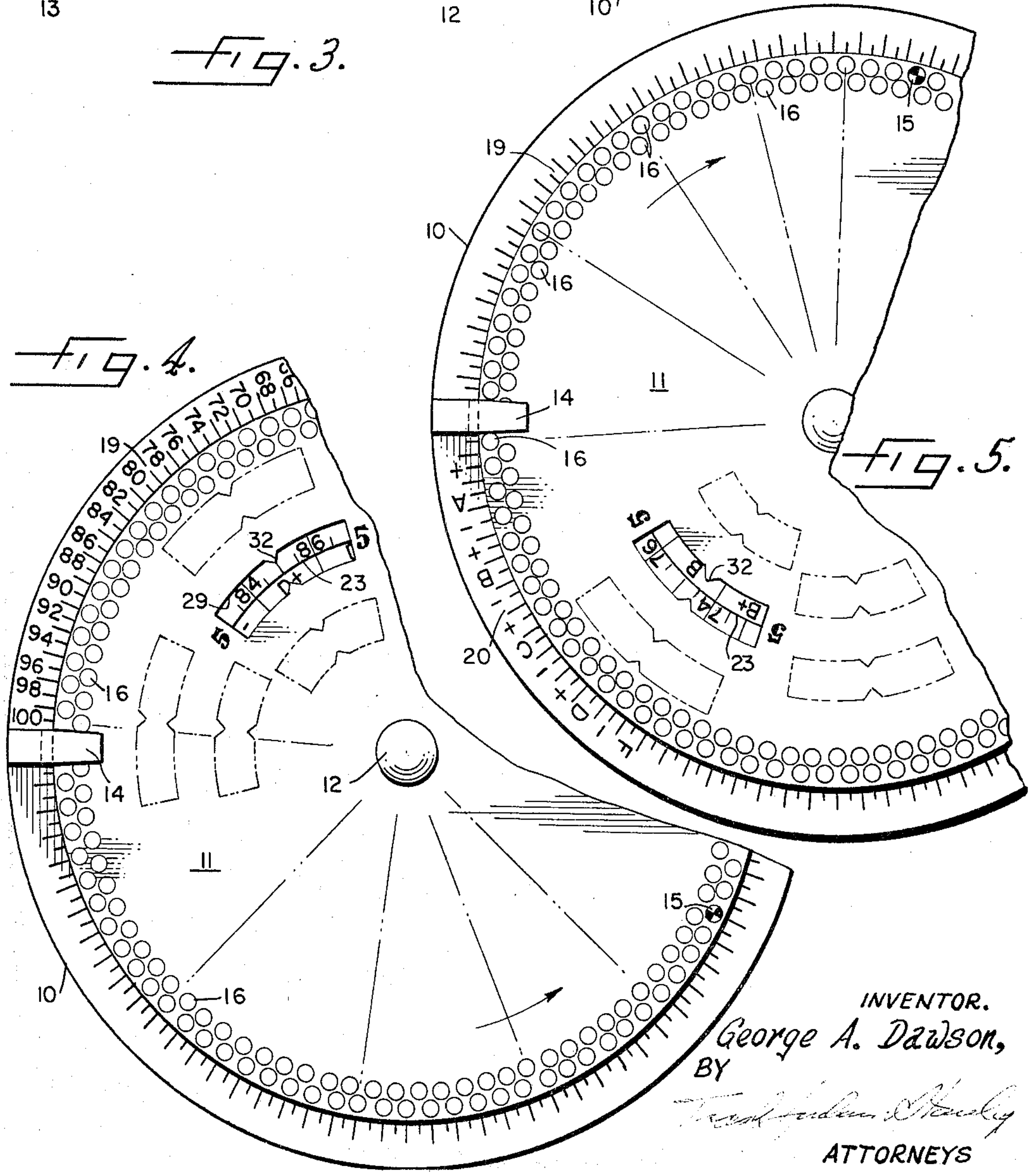
FIG. 4 is a fragmental view similar to FIG. 1 showing the disk in the position occupied at the termination of an operation averaging five percentage grades.
FIG. 5 is a fragmental view also similar to FIG. 1 showing the disk in the position occupied at the termination of an operation averaging five letter grades.

FIG. 4 illustrates the disk in the position attained after successively putting in grades of 95, 88, 85, 82, and 75, the recesses 16 at the ends of the radial chain lines being those which respectively received the stylus in effecting the increments of disk-rotation. Since there were five grades in the series averaged, the average grade, namely 85, appears on scale 23 at the pointers 32 of the "5" window 29.

Averaging a series of letter grades is carried out in the same manner as that just described except that the operation starts with the pin 15 against the clockwise face of the abutment 14 and the disk is rotated incrementally in a clockwise direction. FIG. 5 illustrates the device in the condition existing after grades of A+, B+, B, B—, and C— have been put in. Again, the recesses 16 at the ends of the radial chain lines are those which respectively received the stylus in effecting the increments of disk-rotation; and, since there were five grades in the series, the average grade of B is indicated by the pointers 32 of the "5" window.

Reference has been made above to the fact that in the specific device shown, no rotation of the disk is involved in taking account of a grade of 100 when averaging grades expressed in percent. Whether or not the various scales are so arranged as to permit that type of operation is a matter of choice and will affect the locating and labeling of the graduations of the scales 21–26. As the lettered scales are shown in the drawing, the putting in of an A+ grade involves a disk-rotation of 4°, and each successive grade in decreasing order involves an incremental rotation 4° more than the next higher grade. Accordingly, a 12° rotation of the disk would be required to bring the "3" window 27 into a centered position with respect to the A+ division of the scale 21, a 16° rotation to bring the "4" window into centered position over the A+ division of scale 22, and so on. The divisions of scales 21–26 labeled from A+ to D— have extents equal respectively to 12°, 16°, 20°, 24°, 28° and 32°. If desired, the lettered divisions of the scales 21–26 may be angularly offset to a slight extent from their theoretically correct positions in order that, in any terminal position of the disk, the pointers 32 will not fall on graduations separating the divisions.

Obviously, practical considerations, especially the permissible diameter of the device, will limit its capacity to average grades. On each of the scales 21–26, the angular intervals separating graduations are multiples of the corresponding intervals in the scales at the periphery of the base plate 10. Thus, in the scale 21, used in averaging a series of three grades, the angular interval between graduations is three times that of the corresponding interval in the peripheral scales; and, in general, the interval in any particular one of the interior scales 21–26 is equal to the corresponding interval in the peripheral scales multiplied by the number of grades in the series whose average is indicated on that interior scale. While each interior scale is shown as having an extent of 360°, not all of that extent is usable, since the presence of the abutment 14 in the path of the pin 15 limits rotation of the disk to something less than 360°, specifically to 352° in the device as illustrated. For a device six inches in diameter an interval of 2° on the peripheral scale is about the smallest practicable; and if that interval represents a difference of one percentage point the corresponding interval on an interior scale for use in averaging seven grades would be 14° and the lowest average such a scale could indicate would be about 75 percent. As that figure is relatively high, it is not contemplated that the "7" and "8" scales in the device of the drawings will be used in averaging percentage grades, and hence those scales are not shown as labeled to indicate percentages. The "6" scale 25, which is so labeled, can indicate six-grade averages down to 71 percent. The same factors which limit the lowest average percentage grade any interior scale can indicate also apply in the case of letter grades. Thus, with a 4° interval separating adjacent letter grades on peripheral scale 20, each division of the "8" interior scale 25 occupies 32°, and the lowest average letter grade that scale can indicate is D. Elimination of percentage-indicating numbers on the two inner interior scales makes it possible for both those scales to be visible through the same window 31 without making that window any wider radially than are the other windows.

When the number of grades in the series to be averaged exceeds the highest number for which the device is adapted to give a direct indication, it will frequently be possible to obtain the average by dividing the series into sets of equal number, and then using the device first to average each set and second to obtain the average of the set-averages. For example, a series of 15 grades might be averaged by dividing it into three sets of five grades each, separately averaging the five grades of each set, and finally averaging the three set-averages. Such procedure is accurate, however, only when the number of grades in the series is a multiple of numbers of grades in sets the device is adapted to handle directly. In other instances an accurate approximation to an average grade can be made by laying aside one or more grades to leave a remainder which can be averaged with use of the device, averaging the remainder, and mentally modifying the average thus obtained, having regard to the number and value of the grade or grades initially laid aside. Thus, a series of fourteen percentage grades might be averaged by laying aside two grades, preferably two which can readily be averaged mentally, using the device to obtain the average of the remaining twelve grades, and mentally modifying that average by one-seventh of the difference between it and the average of the two grades initially laid aside.

I claim:

1. In combination, a base plate, a disk rotatably mounted on said base plate, said disk being provided adjacent its periphery with a circumferentialy extending series of recesses spaced at equal angular intervals and radially staggered, each of said recesses being adapted to receive a stylus manipulable to rotate the disk through angular increments, an abutment mounted on said base and having a side face extending radially of said disk in a position to be engaged by the recess-received stylus and thereby limit rotation of the disk by the stylus, and a stop fixed to the disk in position to engage the abutment, the effective angular extent of said abutment being such that when said stop engages one face of the abument the other face of the abutment will be tangent to one of said recesses, said disk being provided with a plurality of windows exposing the face of the base plate within the periphery of the disk, said windows being located at different distances from the axis of the disk and staggered angularly with respect to such axis, at least one side of each window being provided with a pointer projecting radially into the window, said base plate being provided with a graduated scale extending from the abutment along and just outside of the disk-periphery, said base plate also being provided with a plurality of interior circumferentially extending, graduated scales respectively visible through said windows.

2. In combination, a base plate, a disk rotatably mounted on said base plate, said disk being provided adjacent its periphery with a circumferentially extending series of recesses spaced at equal angular intervals, each of said recesses being adapted to receive a stylus manipulable to rotate the disk through angular increments, an abutment mounted on said base in a position to be engaged by the recess-received stylus and thereby limit rotation of the disk by the stylus, and a stop fixed to the disk in position to engage the abutment, the effective angular extent of said abutment being such that when said stop engages one face of the abutment the other face of the abutment will be tangent to one of said recesses, said disk being provided with a plurality of windows exposing the face of the base plate within the periphery of the disk, said windows being located at different distances from the axis of the disk and staggered angularly with respect to such axis, at least one side of each window being provided with a pointer projecting radially into the window, said base plate being provided with a graduated scale extending from the abutment along and just outside of the disk-periphery, said base plate also being provided with a plurality of interior circumferentially extending, graduated scales respectively visible through said windows.

3. In combination, a base plate, a disk rotatably mounted on said base plate, said disk being provided adjacent its periphery with a circumferentially extending series of recesses spaced at equal angular intervals and radially staggered, each of said recesses being adapted to receive a stylus manipulable to rotate the disk through angular increments, an abutment mounted on said base and having a side face extending radially of said disk in a position to be engaged by the recess-received stylus and thereby limit rotation of the disk by the stylus, and a stop fixed to the disk in position to engage the abutment, the effective angular extent of said abutment being such that when said stop engages one face of the abutment the other face of the abutment will be tangent to one of said recesses, said disk being provided with a plurality of windows exposing the face of the base plate within the periphery of the disk, said windows being located at different distances from the axis of the disk, at least one side of each window being provided with a pointer projecting radially into the window, said base plate being provided with a graduated scale extending from the abutment along and just outside of the disk-periphery, said base plate also being provided with a plurality of interior circumferentially extending, graduated scales respectively visible through said windows.

4. In combination, a base plate, a disk rotatably mounted on said base plate, said disk being provided adjacent its periphery with a circumferentially extending series of recesses spaced at equal angular intervals, each of said recesses being adapted to receive a stylus manipulable to rotate the disk through angular increments, an abutment mounted on said base in a position to be engaged by the recess-received stylus and thereby limit rotation of the disk by the stylus, and a stop fixed to the disk in position to engage the abutment, the effective angular extent of said abutment being such that when said stop engages one face of the abutment the other face of the abutment will be tangent to one of said recesses, said disk being provided with a plurality of windows exposing the face of the base plate within the periphery of the disk, said windows being located at different distances from the axis of the disk, said base plate being provided with a graduated scale extending from the abutment along and just outside of the disk-periphery, said base plate also being provided with a plurality of interior circumferentially extending, graduated scales respectively visible through said windows.

5. In combination, a base plate, a disk rotatably mounted on said base plate, said disk being provided adjacent its periphery with a circumferentially extending series of recesses spaced at equal angular intervals and radially staggered, each of said recesses being adapted to receive a stylus manipulable to rotate the disk through angular increments, an abutment mounted on said base and having a side face extending radially of said disk in a position to be engaged by the recess-received stylus and thereby limit rotation of the disk by the stylus, and a stop fixed to the disk in position to engage the abutment, said disk being provided with a plurality of windows exposing the face of the base plate within the periphery of the disk, said windows being located at different distances from the axis of the disk, said base plate being provided with a graduated scale extending from the abutment along and just outside of the disk-periphery, said base plate also being provided with a plurality of interior circumferentially extending, graduated scales respectively visible through said windows.

6. In combination, a base plate, a disk rotatably mounted on said base plate, said disk being provided adjacent its periphery with a circumferentially extending series of recesses spaced at equal angular intervals, each of said recesses being adapted to receive a stylus manipulable to rotate the disk through angular increments, an abutment mounted in said base in a position to be engaged by the recess-received stylus and thereby limit rotation of the disk by the stylus, and a stop fixed to the disk in position to engage the abutment, said disk being provided with a plurality of windows exposing the face of the base plate within the periphery of the disk, said windows being located at different distances from the axis of the disk, said base plate being provided with a graduated scale extending from the abutment along and just outside of the disk-periphery, said base plate also being provided with a plurality of interior circumferentially extending, graduated scales respectively visible through said windows.

7. The combination of claim 6 with the addition that the respective intervals between graduations of said interior scales correspond to different integral multiples of the angular interval between graduations of the first mentioned scale.

8. In combination, a base plate, a disk rotatably mounted on said base plate, said disk being provided adjacent its periphery with a circumferentially extending series of recesses spaced at equal angular intervals, each of said recesses being adapted to receive a stylus manipulable to rotate the disk through angular increments, an abutment mounted on said base in a position to be engaged by the recess-received stylus and thereby limit rotation of the disk by the stylus, and a stop fixed to the disk in position to engage the abutment, said disk being provided with a window exposing the face of the base plate within the periphery of the disk, said base plate being provided with a first scale having graduations spaced at equal angular intervals and extending from the abutment along and just outside the periphery of the disk and with a second circumferentially extending scale visible through said window and having graduations spaced at equal angular intervals.

9. The combination of claim 8 with the addition that the angular interval between graduations of the second scale equals an integral multiple of the angular interval between graduations of the first scale.

10. In combination, a base plate, a disk rotatably mounted on said base plate, said disk being provided adjacent its periphery with a circumferentially extending series of recesses spaced at equal angular intervals, each of said recesses being adapted to receive a stylus manipulable to rotate the disk through angular increments, an abutment mounted on said base in a position to be engaged by the recess-received stylus and thereby limit rotation of the disk by the stylus, and a stop fixed to the disk in position to engage the abutment, said base plate being provided with a first scale having graduations spaced at equal angular intervals and extending from the abutment along and just outside the periphery of the disk and with a second circumferentially extending scale visible through the disk and having graduations spaced at equal angular intervals.

References Cited by the Examiner

UNITED STATES PATENTS

| | | | |
|---|---|---|---|
| 711,392 | 10/1902 | Garrison | 235—83 X |
| 1,188,108 | 6/1916 | Smith | 235—78 |
| 2,656,100 | 10/1953 | Mundell | 235—61 |
| 2,825,505 | 3/1958 | Hall | 235—78 |
| 2,908,439 | 10/1959 | Evans | 235—88 |
| 3,002,683 | 10/1961 | Rowland | 235—83 |
| 3,095,144 | 6/1963 | Mims | 235—83 X |

RICHARD B. WILKINSON, *Primary Examiner.*